Sept. 9, 1969 HIROSHI USUI ET AL 3,465,512

CLOCK CASE

Filed Nov. 9, 1966 5 Sheets-Sheet 1

INVENTORS

Hiroshi Usui
Takehito Kaminishi

BY Karl W. Flocks

ATTORNEY

INVENTORS

Hiroshi Usui
Takehito Kaminishi

BY Karen W. Flocks

ATTORNEY

CLOCK CASE

Filed Nov. 9, 1966

INVENTORS

Hiroshi Usui

Takehito Kaminishi

BY Karl W. Flocks

ATTORNEY

INVENTORS
Hiroshi Usui
Takehito Kaminishi
BY
Karl W. Flocks
ATTORNEY

INVENTORS

Hiroshi Usui
Takehito Kaminishi

BY [signature]

ATTORNEY

United States Patent Office 3,465,512
Patented Sept. 9, 1969

3,465,512
CLOCK CASE

Hiroshi Usui and Takehito Kaminishi, Tokyo, Japan, assignors to Citizen Watch Co., Ltd., Tokyo, Japan, a corporation of Japan Filed Nov. 9, 1966, Ser. No. 593,204
Claims priority, application Japan, Jan. 27, 1966, 41/5,114
Int. Cl. G04b 37/00
U.S. Cl. 58—53 5 Claims

ABSTRACT OF THE DISCLOSURE

A clock with an angularly adjustable clock mechanism mounted to allow movement of the clock mechanism about the rotary axis of the hands to allow use of the clock in either of two 90° rotated positions of the clock face. A torque transmitting means using magnets and parallel spaced plates of which one is transparent allows pictures placed therebetween to appear on the clock face.

The present invention relates to clocks and particularly to table clocks and wall clocks.

An object of the present invention is to provide a clock in which pictures, photographs or cards having letters or patterns thereon are so detachably disposed at the back of the hands indicating times as to be visible.

Another object of the present invention is to provide a clock which can be positioned lengthwise or sidewise without replacing the hands, so that photographs, pictures or cards of either made sidewise or lengthwise may be employed.

Hitherto, pictures are made on the dial of a clock, so that if the exchange of the picture is required the dial must be changed. As the exchange of the dial can not be done by users, they could not exchange the picture, even if they have tired of the picture. Further, the pictures are limited to those which have been prepared by the makers. In clocks of which the dials are relatively easily exchanged, slits or openings for passing the sleeve or cannon pinion of the hands should be provided in the dials. Therefore, the appearances of pictures are defiled.

In the clock according to the present invention, any pictures, photographs or cards can be easily applied onto the clocks without removing the dials. Whenever the users prefer new pictures, photographs or cards to those which have been mounted on the clocks, the users can easily exchange them by inserting new articles into the clock. In the clocks according to the present invention, pictures, photographs or cards made sidewise can be substituted for those made lengthwise and this exchange can be done conversely. For these purposes, in the clocks according to the present invention, means of correcting errors in the indications of hands is provided, said error taking place when the position of clock is changed from the lengthwise aspect to the sidewise aspect or reversely. In the past, when it was desired to so change the position of clock as mentioned above, the indicating means should be replaced to a position corrected by an angle of 90°.

According to the present invention, a clock is provided wherein an indication unit supporting indicating means is disposed just before a driving unit including a driving shaft. Said indicating means comprises two thin plates disposed in parallel to and at a small distance from each other, of which one plate is positioned in front of the other is transparent and an indicator is supported by said transparent plate. A picture, photograph or card is inserted between said two plates. Thus, the picture, photograph or card is visible through said transparent plate. In the clock of the present invention, as described above, the driving unit and the indicating means are separated mechanically by said plates in order to insert the picture, photograph or card between said driving unit and the indicating means.

The other objects and advantages of the present invention will be understood from the following descriptions in reference to the drawing in which.

Figure 1:
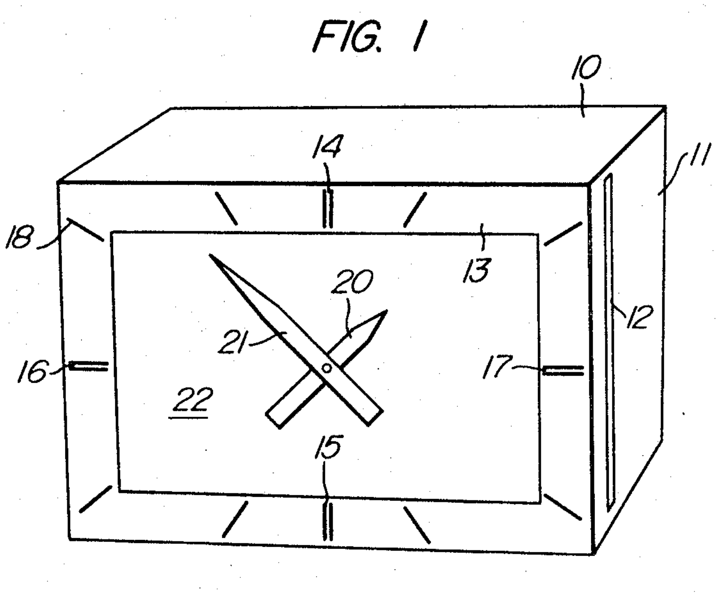
FIGURE 1 is a perspective view showing the clock according to the present invention.

In the FIGURE 1 a table clock applied with the present invention is shown. The table clock comprises a casing 10 of which the side wall portion 11 has a slit 12 for inserting a picture card or a photograph therethrough into said casing. An inner flange 13 is formed at the front peripheral edge of said casing 10. Marks 14 and 15 are formed at the center of the horizontal portions of said inner flange 13, each mark consisting of two lines vertically drawn in parallel to each other. The upper mark 14 is employed for showing twelve o'clock and the lower mark 15 is employed for showing six o'clock. Further, two marks 16 and 17 are made on the side portions of said inner flange portion 13, respectively. These marks are drawn horizontally at the central points of said side portions and each consisting of two horizontal lines in parallel to each other as same as the marks 14 and 15. The mark 16 corresponds to 9 o'clock and the mark 17 corresponds to 3 o'clock. Between these marks a plurality of single-line marks shown by a reference 18 representatively is drawn for indicating times other than above times indicated by the marks of two parallel lines. An hour hand 20 and a minute hand 21 can be seen through a glass plate 22.

The casing 10 encloses a housing 23 containing a clock mechanism, an hour hand driver 24, a minute hand driver 25, card supporting means 36 and the hour and minute hands 20 and 21. The housing 23 is placed in an opening 28 of a supporting member 27 of ring-shape and angularly movably mounted to said supporting member 27 by screws 26 at a flange 30 which is secured to the outer peripheral wall of said housing 23. Said carrier is secured to a supporting panel 31 by screws 32. The panel 31 is mounted to the flange portion 13 by screws 33. Spacers 34 of cylindrical form through which said screws 33 are passed are disposed between said flange portion 13 and said panel 31 and about said screws 33 to place said panel 31 at the desired distance from said flange portion 13. In addition, a front glass plate 22 is disposed between said portion 13 and a frame 35 of which the sectional area is an L shape. The glass plate 22 and frame 35 are clamped by the flange portion 13 and the spacer 34 between them.

Figure 5:
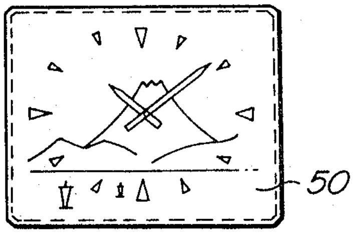
FIGURE 5 is a plane view showing a picture card used for the clock according to the present invention.
Figure 6:
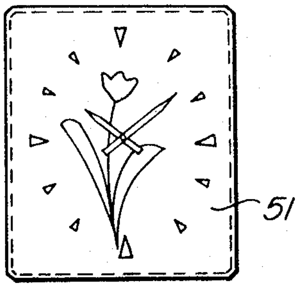
FIGURE 6 is a plane view showing another picture card used for the clock according to the present invention.
Figure 7:
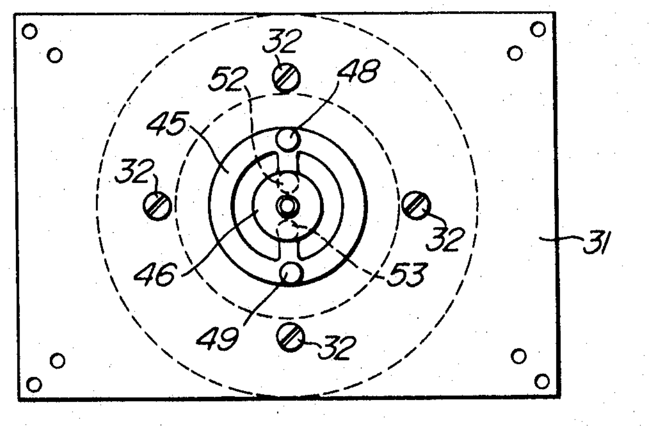
FIGURE 7 is an elevational plane view showing the clock of the present invention; in which the front glass plate and the card supporting means are removed to show clearly the hand driving means.

A supporting structure 36 for supporting a card comprises two parallel plates 37 and 38. Said plate 37 is made of a transparent plate of plastic material. Said plates 37 and 38 are mounted in parallel to the panel 31 by means of screws 39. Spacing bars 40 are disposed between said two plates 37 and 38, so that said plates are placed apart from each other. Cylindrical spacers 41 are disposed between said plate 28 and the panel 31 to place said supporting structure at the desired distance from said panel 31. Said plates 37 and 38 are mounted apart from each other as described above, so that a slit 42 or clearance may be provided between said plates for inserting a picture card 50 or 51 as shown in FIG. 5 or 6, a photograph or the like.

Figure 2:
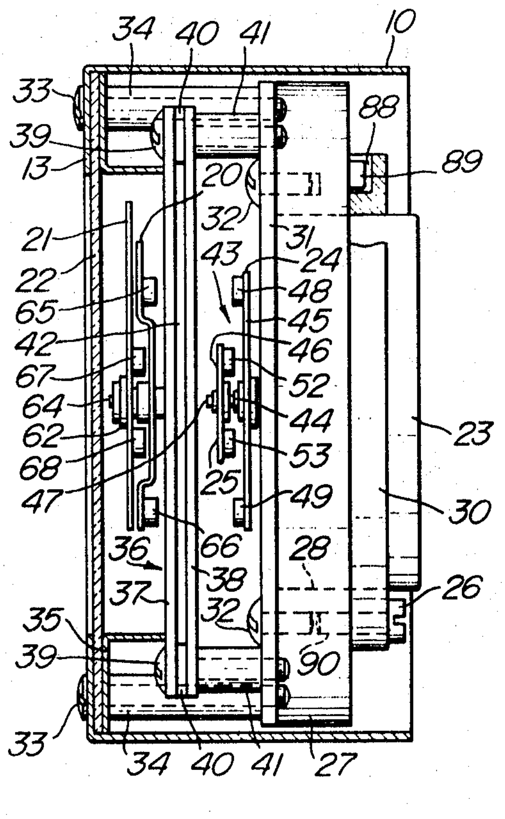
FIGURE 2 is a sectional view of the clock shown in the FIGURE 1.
Figure 8:
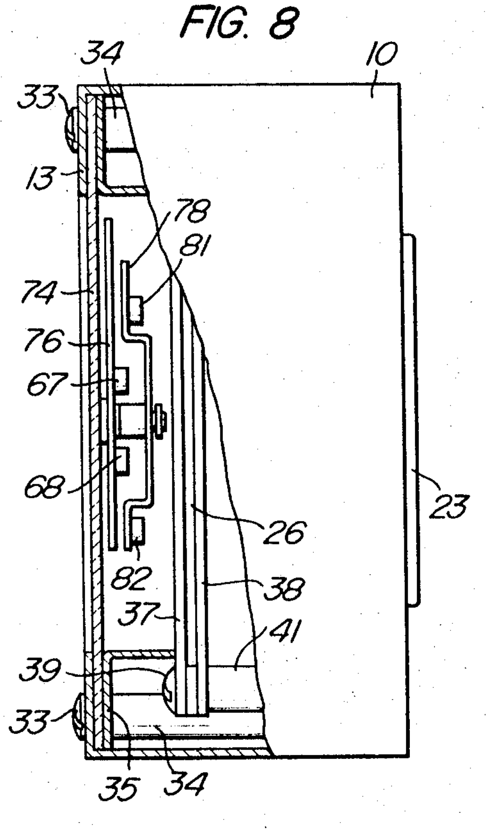
FIGURE 8 is a sectional view of another embodiment of the present invention.

A driving means 43 for driving the hour hand 20 and the minute hand 21 is arranged in the front of said panel 31. In FIGURES 2 and 8, an hour wheel 44 is projected through said panel 31 and is provided with an hour hand driving member 45 at its end. A minute hand driving member 46 is secured to the end of a driving shaft 47 projecting through said hour wheel 44. The hour wheel 44 and driving shaft 47 are of the usual clock mechanism contained into the housing 23. Said members 45 and 46 are together a wheel shape preferably. A pair of permanent magnets 48 and 49 are attached to said member 45 at the opposite ends of a diameter. A pair of permanent magnets 52 and 53 are attached to said member 46 at the opposite ends of a diameter. For attaching these magnets to said members, adhesive agent may be used. These permanent magnets are made of ferrite materials preferably. The direction of magnetic polarity is perpendicular to the rotation plane of the member supporting said magnet.

The hour hand 20 and the minute hand 21 are mounted rotatably on the transparent plate 37. This mounting manner is particularly shown in FIGURE 4. A rod 55 is fixed at the inner end thereof to the plate 37. A flange 56 is formed at said end for ensuring the bond between the rod 55 and the plate 37. The flanged end of said rod 55 is embedded into the plate 37 when said plate 37 is moulded. The rod 55 is provided with an enlarged portion 57 and a reduced portion 58. A supporting collar 59 is rotatably disposed on said enlarged portion 57. The hour hand 20 is fixedly supported by said supporting collar 59. That is, said collar 59 is inserted through an opening 60 of the hand and a flanged portion 61 of said collar 59 is adhered at its rear end surface to the hand 20 with an adhesive. A collar 62 is disposed rotatably about said reduced portion 58 of the rod 55. On this collar 62 the minute hand 21 is secured by the same manner as described above. A nut 63 is threaded into a threaded portion 64 formed at the outer end of said rod 55. The collar 59 is prevented its dismount from said rod 55 by said collar 62. Therefore, the hands 20 and 21 can rotate on the rod 55, individually.

A pair of permanent magnets 65 and 66 are adhered on the rear surface of said hour hand 20, symmetrically in relation to the rotation center and in corresponding positions to the magnets 48 and 49 on the member 45. A pair of permanent magnets 67 and 68 are adhered on the rear surface of said minute hand 21 with an adhesive in the positions corresponding to the magnets 52 and 53. The polarities of these magnets are taken in the directions perpendicular to the rotation plane of the hand. The directions of polarities in the magnets 65 and 66 are same as the directions of polarities in the magnets 48 and 49, respectively. Therefore, the end surfaces of the magnets 48 and 65 face each other, and they have the polarity different from each other, and also the polarities of the magnets 49 and 66 are same as the case of the magnets 48 and 65. The polarities of the magnets 52, 53, 67 and 68 are same as the case of the magnets 48 and 65.

When the clock described above is used in the sidewise aspect as shown in the FIGURE 1, the housing 23 of the clock mechanism is mounted to the ring 27 so that the magnets 48 and 49 and the magnets 52 and 53 come to on the upright line connecting the mark 14 indicating twelve o'clock and the mark 15 indicating six o'clock.

The member 45 is driven by the clock mechanism so as to rotate at the rate of one time per twelve hours. The member 46 is driven by said mechanism so as to rotate at the rate of one time per hour. As aforesaid the polarities of the ends of the two pairs of magnets 48, 49 and 65, 66 are different so that magnets 65 and 66 move together with the magnets 48 and 49 about the rod 55. Therefore, the hand 20 operates so as to indicate "hours." The magnets 67 and 68 move together with the magnets 52 and 53. The hand 21 operates so as to indicate "minutes."

In the present invention, the hands 20 and 21 are driven by the magnetic force without any mechanical connection between these hands and the driving members 45 and 46. This fact makes possible the insertion of a card or photograph between the time indicating means and the clock mechanism. The slit 12 is provided in one side wall 11 of the casing 10 (FIG. 1) and through this slit 12 a picture card 50 as illustrateed in FIG. 5 is inserted between the plates 37 and 38. The card 50 is supported on the lower spacing bar 40 disposed in the under side. The card 50 is visible through the glass plate 22 and the transparent resin plate 37. Further, the card 50 can be exchanged for another card or photograph at any time without any manual operation for the clock. The clock in the present invention has the effect as an ordinary clock and is employed as a frame for pictures, portrait photographs or scenery photographs.

In the clock embodied from the present invention, as aforesaid, the front window is covered with the transparent glass plate. However, this front glass plate can be substituted by a plate made of transparent resin indicating rials. In the case of the resin plate, the time indicating means comprising the hour and minute hands may be supported on such front plate. In this case, if desired the plate 37 for supporting the card may be substituted by a transparent glass plate.

Figure 3:
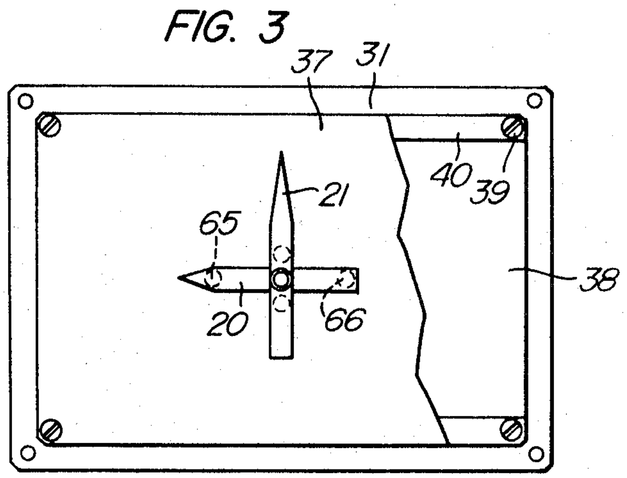
FIGURE 3 is an elevational view of the clock shown in the FIGURE 1, in which a part of the front glass plate is omitted.
Figure 4:
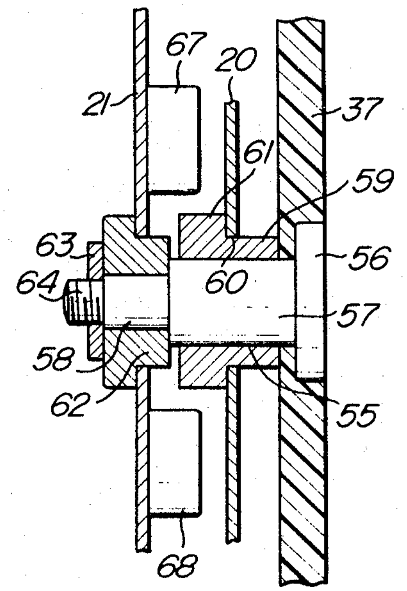
FIGURE 4 is an enlarged sectional partial view showing a mechanism for mounting rotatably the hour hand and minute hand to a supporting plate.
Figure 9:
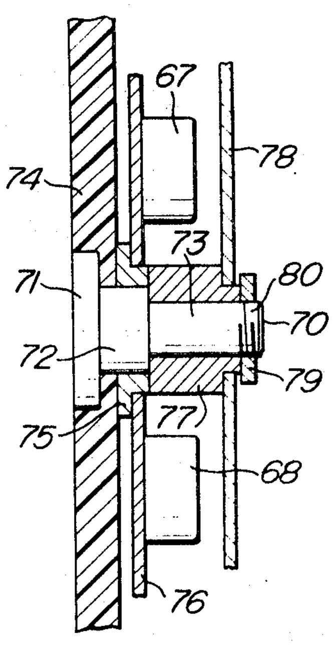
FIGURE 9 is a partial sectional view showing the hands mounting structure of the embodiment shown in the FIGURE 8.

The clock shown in FIGURES 8 and 9 is same as the clock shown in FIGURES 2 to 4 except the mounting manner of the time indicating means including the hour and minute hands. In FIGURES 8 and 9, a supporting rod 70 is provided with a flange 71 at its outer end and has an enlarged portion 72 and a reduced portion 73. The flange 71 and a part of said enlarged portion 72 are embedded into a front plate 74 when the plate 74 is moulded. A collar 75, on which a minute hand 76 is adhered, is mounted rotatably about said enlarged portion 72. Another collar 77, on which an hour hand 78 is adhered, is mounted rotatably about said reduced portion 73. A screw nut 79 is threaded to the end 80 having screw threads to avoid the slide out movements of said collars 75 and 77 from the rod 70.

On the minute hand 76, the permanent magnets 67 and 68 are adhered as same as aforesaid in connection with the hand 21. On the hour hand 78, a pair of permanent magnets 81 and 82 are adhered as same as aforesaid in connection with the hand 20. The operations of the clock shown in FIGURES 8 and 9 are same same as those of the clock shown in FIGURES 2 to 4.

Figure 11:
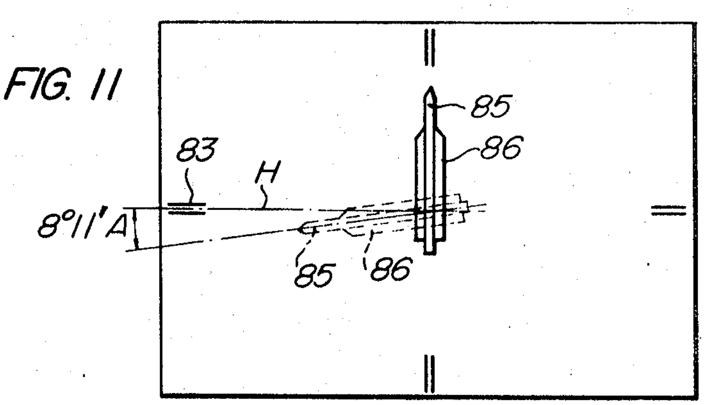
FIGURE 11 is a diagrammatic view for explaining the operations of the hour hand and the minute hand in general clocks.

When the card 50 of the sidewise view is desired to substitute for a card 51 of the lengthwise view as shown in FIGURE 6, the clock has to be placed in the lengthwise aspect. In general, a clock made to be used in the sidewise aspect can not be used in the lengthwise aspect. Similarly, a clock to be used in the lengthwise aspect can not be used in the sidewise aspect. Because, if any one attempts to use the clock in the lengthwise aspect adjusted to be used in the sidewise aspect as shown in FIGURE 11, he will note that the hands do not indicate correct times, that is, the angular relationship between the hour hand and minute hand is incorrect. Referring to FIGURE 11, in the clock adjusted to be used in the sidewise aspect, the hands rightly overlap one another at the position indicating twelve o'clock. Between the positions indicating 8 o'clock and 9 o'clock the hands 85 and 86 rightly overlap one another on the line drawn at the angle A of 8°11′ to the horizontal line H as shown in FIGURE 11. If this clock was used in the lengthwise aspect in which a mark 83 indicating 6 o'clock is positioned at the upper side, the hands 85 and 86 do not overlap one another at the right position indicating twelve o'clock but said hands overlap one another at the position behind the line H by the angle of 8°11′. Accordingly, any correction is necessary in order to use the sidewise-use clock as the lengthwise-use clock. One way of said correction is as follows.

The clock mechanism including the hour hand and minute hand is angularly shifted by the angle of 8°11′ in a counterclockwise direction in relation to the dial. In this condition, the clock mechanism is fixed to the dial. In that case, the position of overlapping of the hands is set forward by the shifted angle of 8°11′ to the time indicated by the line H. After this correction, the clock is used in the condition that the position of twelve o'clock gets changed to the position of three o'clock. That is, the sidewise-use clock can be used in the lengthwise aspect.

Another way of the rectification or correction is as follows. In this other way of the rectification, the clock mechanism is shifted angularly at the angle of 90°. In this case, the lengthwise-use clock can be used as the sidewise clock or the sidewise-use clock can be used as the lengthwise-use clock.

Figure 10:
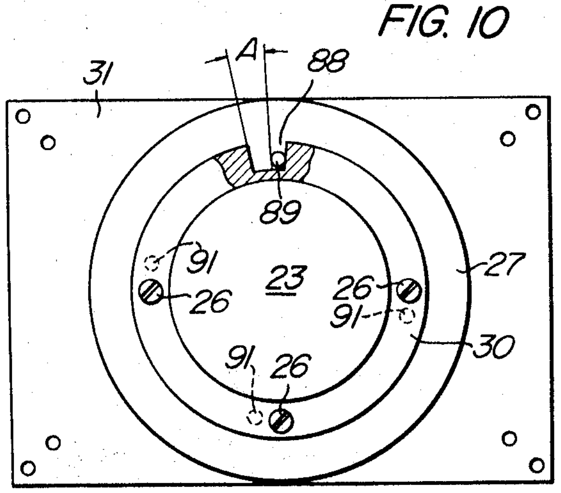
FIGURE 10 is a plane view of the rear side of the clock according to the present invention, in which means for adjusting the aspect of the clock is shown.

In one embodiment of the present invention, as shown in FIGURES 2 and 10, rectifying or adjusting means are provided to the clock. A recess 88 is formed in the flange 30 of the housing 23. A stud 89 is disposed on the supporting ring 27 so as to project from the upper surface of said supporting ring 27 into said recess 88. The flange 30 is secured to the supporting member 27 by the screws 26, as aforesaid. The threaded bore to which said screw 40 is engaged is disposed in one bore for each one screw (26). Two threaded bores 90 and 91 are provided in the supporting member 27 for the one screw 40. The centers of two threaded bores 90 and 91 are apart from each other by a desired distance on the circle passing through these bores. Said desired distance corresponds to the shift angle of 8°11′. The housing 23 of the clock mechanism is set in angularly shifted aspect in relation to the other aspect by engaging the screw 40 with any one of the bores 90 and 91. The condition shown in FIGURE 10 is that which gets rectified to be changed from the sidewise-use to the lengthwise-use. In this rectified status or condition, the mark indicating twelve o'clock in the original status is used as the mark indicating three o'clock.

If it is desired to change the status shown in FIGURE 10, all the screws 40 are threaded out from the bores 90 and then the housing 23 is rotated in the clockwise direction by the angle of 8°11′, and thereafter the screws 40 are threaded into the bores 91 to set the housing to the supporting member 27. In order to facilitate the positioning of the housing 23 relative to the supporting member 27, the recess 88 and the stud 89 are provided. The housing 23 is made possible to move angularly about the center thereof in the range limited by the stud 89. This range is shown with the reference A (8°11′) in FIGURE 10.

Figure 12:
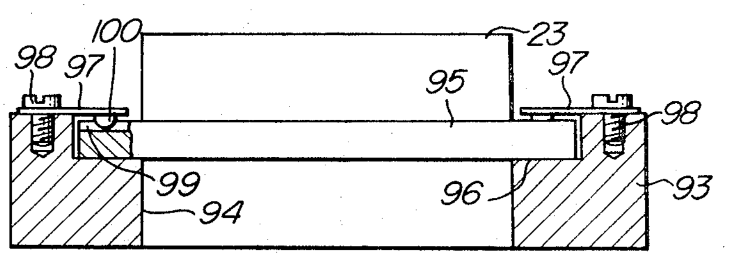
FIGURE 12 is a sectional view showing the housing of clock and supporting means thereof, in which the other adjusting means is shown.
Figure 13:
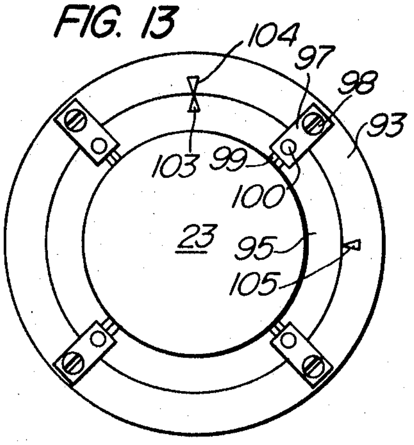
FIGURE 13 is a plane view showing further another means for adjusting the aspect of the clock.
Figure 14:
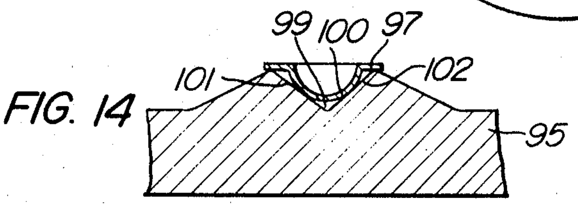
FIGURE 14 is a partial sectional view of the adjusting means shown in the FIGURE 13.

Another embodiment for rectifying the indication of time is shown in FIGURES 12 to 14. In this embodiment, the housing containing the clock mechanism may be angularly shifted by the angle of 90 degrees. In this case, the supporting member of a ring shape and the flange for setting the housing of the clock mechanism to the supporting member are different from those described in the aforesaid embodiment in the structure.

A supporting member 93 to be secured to the panel 31 has a central opening 94 into which the housing 23 is rotatably inserted. A flange 95 secured to the outer peripheral wall of said housing 23 is placed with the under surface being contacted to the upper surface of a depressed portion 96 formed along the inner peripheral edge of said member 93. Four spring plates 97 are fixed radially on the depressed portion 96 by screws 98 in even angular distances, that is, the angle between two adjacent spring plates is 90 degrees. On the other hand, four recesses 99 of V-shape are provided on the upper surface of the flange 95 in the same angular distances. Said each plate spring is provided with a spherical projection 100 on the under surface thereof. The spherical projection may be engaged to said recess 99 so that the flange is resiliently fixed to the supporting member 93. If it is desired to change the status of the clock to either status of the sidewise-use or the lengthwise-use, this will be carried out by angularly moving the housing 23 in relation to the supporting member 93 and by engaging the spherical projection 100 of the spring plate 97 to the adjacent recess 99. In order to facilitate such the disengaging and engaging of the spring plate and the recess, both opposite sides of the recess 99 are formed into inclined surfaces 101 and 102. Further, in order to ensure the angular shift of the housing 23, one mark 103 may be provided on the upper surface of the flange 95 and two marks 104 and 105 apart from each other by 90 degrees are provided on the upper surface of the supporting member 93. It may be confirmed that the clock gets changed from the sidewise-use of the lengthwise-use or from the lengthwise-use to the sidewise-use.

Figure 15:
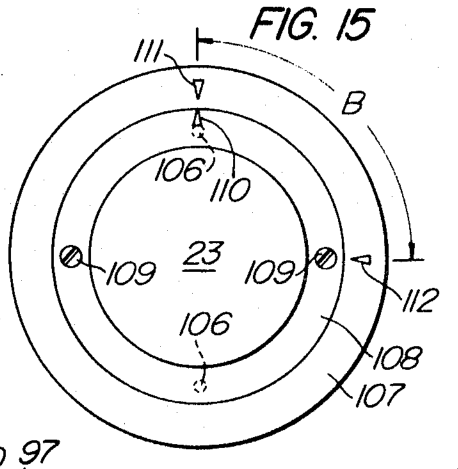
FIGURE 15 is a plane view showing other adjusting means.

FIGURE 15 shows another manner for angularly shifting. In this embodiment, four threaded bores 106 are disposed in the supporting member 107, said bores 106 being disposed at intervals of 90 degrees. The flange 108 secured to the outer peripheral wall of the housing 23 is fixed to said supporting member 107 by screws 109 to be screwed to said bore 106 through the flange 108. On the upper surface of the flange 108 a mark 110 is provided as well as in the aforementioned embodiment, and on the upper surface of the supporting member 107 two marks 111 and 112 corresponding to said mark 110 are provided. These marks 110, 111 and 112 serve as the confirmation of the change of the status of the clock as mentioned in connection with the embodiment shown in FIGURES 12 to 13.

What is claimed is:

1. A clock with minute and hour hands comprising a casing; time indicating means including the hands carried by said casing; and a housing containing a clock mechanism; wherein an elongated slit is formed on one side wall of said casing, and said housing is rotatably disposed about the axis of the hands relatively to said casing, a pair of plates is disposed parallel to and closely apart from each other forming a clearance between said plates, and said clearance is disposed at the position corresponding to said slit to allow insertion of a picture card into said clearance through said slit.

2. A clock according to claim 1 comprising a unit means including said clock mechanism; and a supporting means including said time indicating means for said unit means; said casing containing said supporting means and said housing of said clock mechanism; said housing being rotatable about the longitudinal axis of the hands and supported within the desired limited angle onto said supporting means; means for adjusting the angular relationship between said supporting means and said housing, a torque transmitting means disposed on the output means of said clock mechanism, said transmitting means comprising permanent magnets; and a torque receiving means disposed on said time indicating means, said torque receiving means comprising permanent magnets whereby said time indicating means are driven with the magnetic flux between said transmitting and said receiving means.

3. A clock according to claim 1, wherein said time indicating means includes said hour hand and said minute hand driven through the clearance by a torque transmitting means.

4. A clock according to claim 1, further characterized by at least the front plate of said plates defining said clearance is made of a transparent material, and time indicating means is supported by said transparent plate.

5. A clock according to claim 1, wherein said plates are made of transparent material.

References Cited

UNITED STATES PATENTS

| | | | |
|---|---|---|---|
| 1,212,597 | 1/1917 | Wright | 58—54 |
| 2,202,214 | 5/1940 | Livingston et al. | 58—45 |
| 2,700,272 | 1/1955 | Trichel | 58—53 |

RICHARD B. WILKINSON, Primary Examiner

EDITH C. SIMMONS, Assistant Examiner

U.S. Cl. X.R.

58—45